United States Patent [19]

Koga et al.

[11] Patent Number: 4,985,782

[45] Date of Patent: Jan. 15, 1991

[54] REPRODUCTION SYSTEM CAPABLE OF REPRODUCING A STILL IMAGE BY INTERRUPTING A SEQUENCE OF RECORDED SIGNALS

[75] Inventors: Toshio Koga; Junichi Ohki; Mutsumi Ohta, all of Tokyo; Hideto Kunihiro, Osaka, all of Japan

[73] Assignees: NEC Corp.; NEC Home Electronics Ltd., both of Japan

[21] Appl. No.: 189,145

[22] Filed: May 2, 1988

[30] Foreign Application Priority Data

Apr. 30, 1987 [JP] Japan ................................. 62-108353

[51] Int. Cl.$^5$ .............................................. H04N 5/91
[52] U.S. Cl. .................................................... 358/335
[58] Field of Search ........................ 360/32, 33.1, 10.1, 360/10.2, 10.3, 35.1; 358/312, 342, 105, 335

[56] References Cited

U.S. PATENT DOCUMENTS

| | | | |
|---|---|---|---|
| 4,376,268 | 3/1983 | Moriya et al. | 360/10.3 |
| 4,499,506 | 2/1985 | Takahashi et al. | 360/10.1 |
| 4,575,770 | 3/1986 | Dieterich | 358/342 |
| 4,694,357 | 9/1987 | Rahman et al. | 360/32 |
| 4,807,053 | 2/1989 | Heijnemans | 360/10.1 |

Primary Examiner—Donald McElhenry, Jr.
Attorney, Agent, or Firm—Ostrolenk, Faber, Gerb & Soffen

[57] ABSTRACT

In a reproduction system for use in reproducing a still image from a sequence of predictive error signals which is read out of a memory and which is preliminarily processed into a sequence of preliminary processed signals, an intermediate circuit interrupts the preliminary processed signals in response to an external command signal. In the intermediate circuit, the external command signal is resampled by a sequence of frame pulses in a resampling circuit into a resampled signal so as to close a gate circuit. No predictive error signal is sent to an adder circuit during absence of the gate circuit. An identical error signal is repeatedly produced as a sequence of reproduced signals to reproduce the still image.

4 Claims, 4 Drawing Sheets

REPRODUCTION SYSTEM CAPABLE OF REPRODUCING A STILL IMAGE BY INTERRUPTING A SEQUENCE OF RECORDED SIGNALS

BACKGROUND OF THE INVENTION

This invention relates to a reproduction system for use in reproducing a sequence of image signals subjected to redundancy reduction coding.

Attempts have been directed to create a reproduction system comprising a read-only memory which is formed by a compact disk (referred to hereinafter as a CD-ROM). The reproduction system might be available for purposes of amusement and education. Such a CD-ROM is used as an image source in the reproduction system. For convenience of description, the CD-ROM may be called a main image recording medium.

In this event, a succession of images should be memorized in the form of a sequence of image signals in the CD-ROM along with a voice signal accompanying the images. Herein, it is to be noted that such a CD-ROM has a memory capacity which is in the order of 540 megabytes. On the other hand, a usual color image has an amount of information of 500 kilobytes at every frame and should be transmitted at a transmission rate of about 18 megabytes per second.

As a result, when such images are stored in the CD-ROM without any redundancy reduction, the image signals stored in the CD-ROM are reproduced only as, for example, a time period of thirty seconds. This makes practical use of the reproduction system difficult because a requirement in market is directed to a long-term reproduction time in the order of one hour.

In order to respond to such a requirement, an image must be inevitably subjected to redundancy reduction coding or efficient coding. Otherwise, the above-mentioned long-term reproduction can not be realized by the use of such a CD-ROM. More particularly, each image signal for a single frame should be compressed or reduced in redundancy into a compressed image signal of about 5 kilobytes in average. This means that the image signal should be compressed at a compression rate of 1/120.

Recently, it has been proposed that a standard audio signal recording CD-ROM be used as a color image recording CD-ROM which realizes reproduction time of as long as one hour. In this case, an image signal for each frame is recorded on the color image recording CD-ROM in the form of a predictive error signal appearing as a result of efficient coding carried out in a manner to be described later. At any rate, the predictive error signal is subjected to redundancy reduction or compression and may be referred to as a redundancy compression signal. Such efficient coding may be, for example, interframe coding. When the interframe coding is used to code an image including a still portion and a moving portion having a small area in comparison with the still portion, it is possible to reduce an amount of significant information at the still portion.

The above-mentioned reproduction system is very effective and convenient for continuously reproducing, from a CD-ROM, a sequence of predictive error signals. However, it is to be noted here that no consideration is made at all about reproducing a still image from the predictive error signal sequence which might be continuously read out of the CD-ROM. Such a reproduction of a still image will be called a still image reproduction hereinunder and is not simply carried out on reproducing the predictive error signal sequence.

In order to reproduce a still image from a sequence of predictive error signals, consideration might be made about a circuit arrangement which may be a combination of a reproduction system as mentioned above and an image memory connected to the reproduction system. Specifically, a sequence of reproduced or decoded image signals is reproduced by the reproduction system and is once successively stored in the image memory prior to a visual display on a display device, such as a cathode ray tube. With this structure, it is possible to visually reproduce not only a moving image but also a still image. The still image reproduction is possible by repeatedly reading the same reproduced image signal out of the image memory. However, the connection or arrangement of the image memory makes the circuit arrangement intricate in structure. Moreover, it takes a long time for the circuit arrangement to switch from a moving image reproduction to a still image reproduction because the reproduced image signals are visually displayed through the image memory.

SUMMARY OF THE INVENTION

It is an object of this invention to provide a reproduction system which is simple in structure so as to reproduce a still image from a sequence of predictive error signals which may be read out of a CD-ROM.

It is another object of this invention to provide a reproduction system of the type described, which is capable of quickly switching from a moving image reproduction to a still image reproduction.

A reproduction system to which this invention is applicable is for use in reproducing a sequence of predictive error signals into a sequence of reproduced image signals. The predictive error signals convey a sequence of moving images and is subjected to predictive coding. The reproduction system comprises preliminary processing means for processing the predictive error signals into a sequence of preliminary processed signals, intermediate signal producing means responsive to the preliminary processed signals for producing a sequence of intermediate signals, and decoding means responsive to the intermediate signals for predictively decoding the intermediate signals into the reproduced image signals. The reproduction system reproduces the moving images as a still image in response to an external command signal. According to this invention, the intermediate signal producing means comprises modifying means responsive to the preliminary processed signals and the external command signal for forcibly modifying the preliminary processed signals into a sequence of modified signals by interrupting the preliminary processing signals on reception of the external command signal. The modified signals are otherwise substantially equal to the preliminary processed signals. The intermediate signal producing means comprises means for supplying the modified signals to the decoding means as the intermediate signals to make the decoding means reproduce the still image on reception of the external command signal.

DESCRIPTION OF THE PREFERRED EMBODIMENT

Figure 1:
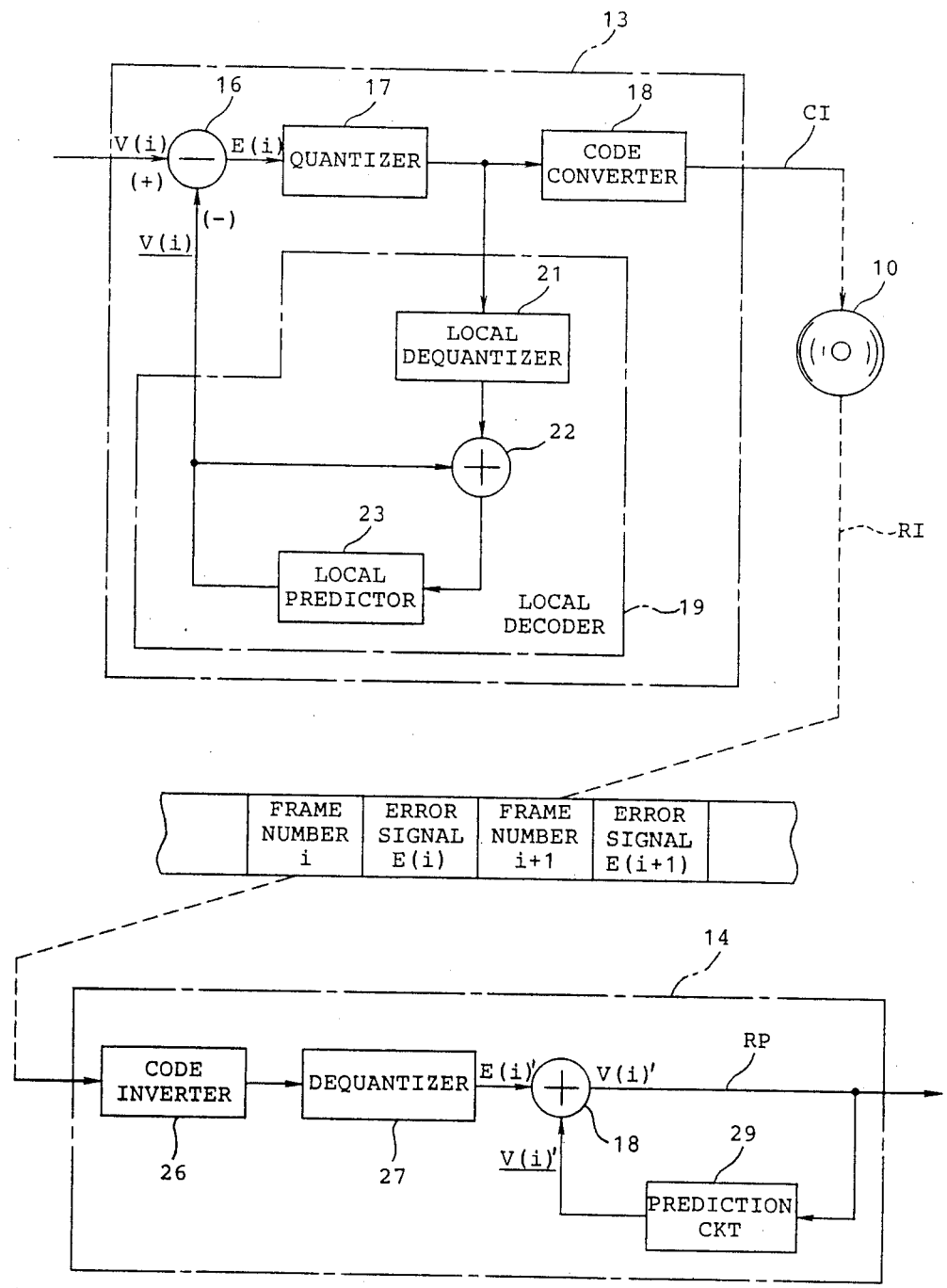
FIG. 1 is a block diagram of a system which can be contemplated to record and reproduce a sequence of image signals on and from a CD-ROM.

FIG. 1 illustrates a general system, which can be formed by the use of conventional techniques to record a sequence of coded signals CI on a CD-ROM 10 and to reproduce a sequence of recorded signals RI from the CD-ROM 10. The coded signals CI may be a sequence of predictive error signals, as will be explained below, and is read out of the CD-ROM 10 as the recorded signal sequence RI.

The illustrated system comprises a recording section 11 and a reproducing section 12, both of which are used in combination with the CD-ROM 10. The recording section 11 is represented by a coder 13 for coding a sequence of image signals V into the coded signal sequence CI while the reproducing section 12 is represented by a decoder 14 for decoding the recorded signal sequence RI into a sequence of reproduced image signals RP.

The coder 13 is supplied with the image signal sequence V which may be a digital signal sequence and which is divided into a succession of frames. Each of the frames carries a plurality of picture elements, as well known in the art. It is assumed that the illustrated coder 13 carries out predictive coding which is known in the art as interframe differential pulse code modulation (DPCM). Therefore, the image signal V of an i-th one of the frames is represented by $V(i)$. In this connection, the predictive coding is often called interframe coding and is very effective to process a television signal which has a strong correlation between frames and a small difference or error therebetween.

In FIG. 1, the image signals V are successively applied to a subtracter 16 which is supplied with a predictive value signal $V(i)$ representative of a predictive value obtained in a manner to be described below. The subtracter 16 successively calculates errors or differences between the image signal $V(i)$ of the i-th frame and the predictive value signal $V(i)$ to produce a sequence of error (i.e., the difference between the actual signal $E(i)$ and the predictive signal $V(i)$) signals $E(i)$ indicative of the errors.

The error signals $E(i)$ are successively applied to a quantizer 17 which quantizes the signal into a sequence of quantized signals. In general, it is known in the art that a distribution of errors between the image signals of the frames can be approximated by a Laplace distribution which is specified by a nonlinear curve. Taking this into consideration, the quantizer 17 has a nonlinear quantization characteristic. The quantized signals are successively delivered to a code converter 18 on one hand and to a local decoder 19 on the other hand. The code converter 18 converts each of the quantized signals into a variable length code signal representative of a code of a variable length and is thereafter stored or written into the CD-ROM 10 as the coded signals CI.

The illustrated local decoder 19 comprises a local dequantizer 21 which locally dequantizes or inversely quantizes the quantized signals into a sequence of local dequantized signals which are local reproductions of the error signals $E(i)$ and which are sent to an adder 22. The adder 22 is supplied with the predictive value signals $V(i)$ from a local predictor 23 to sum up the predictive value signals $V(i)$ and the local dequantized signals and to produce a sequence of sum result signals. The local predictor 23 comprises a delay circuit having a delay time equal to a single frame interval of time and successively delays the sum result signals. At any rate, the local predictor 23 delivers the predictive value signals $V(i)$ to both the subtracter 16 and the adder 22. Thus, the image signals $V(i)$ are successively coded into the coded signals CI by the above-mentioned predictive coding and stored into the CD-ROM 10. In this way, the illustrated coded signals CI carry not only each image signal, namely, each error signal of the frames but also a frame number signal representative of a frame number of each image signal.

On the other hand, the coded signals CI are successively read out of the CD-ROM 10 as the recorded signals RI and are supplied to a code inverter 26 for inverting the recorded signals RI into a sequence of code inverted signals each of which is of a constant length. The code inverted signal sequence is sent to a dequantizer 27 to be dequantized into a sequence of dequantized signals which are reproductions of the error signals $E(i)$ produced by the coder 13 and which are therefore represented by $E(i)'$ in FIG. 1. The dequantized signals $E(i)'$ are delivered to an adder circuit 28 which is given a sequence of decoded prediction signals $V(i)'$ from a prediction circuit 29 substantially equivalent to the local predictor 23 of the coder 13. The decoded prediction signals $V(i)'$ are added to the dequantized signals $E(i)'$ by the adder circuit 28 into the reproduced image signals RP in a known manner.

Figure 2:
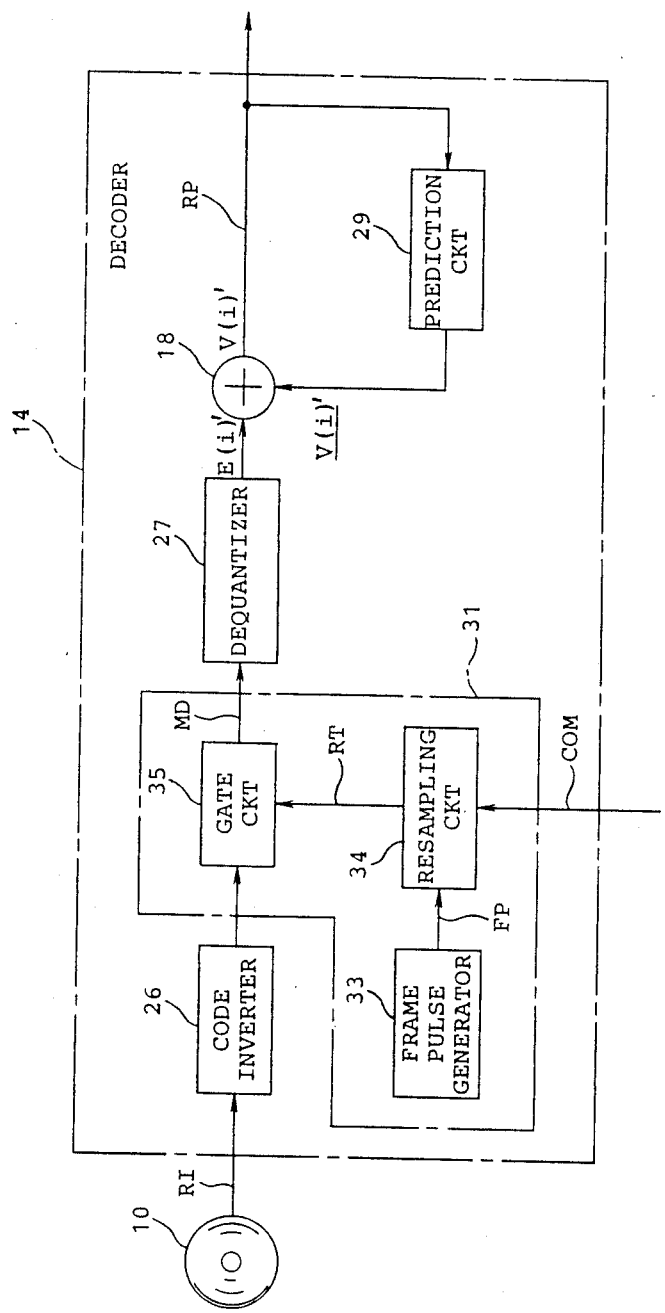
FIG. 2 is a block diagram of a reproduction system according to a preferred embodiment of this invention.

Referring to FIG. 2, a reproduction system according to a preferred embodiment of this invention is similar in structure to that illustrated in FIG. 1 except that the decoder 14 (FIG. 2) includes an intermediate circuit 31 between the code inverter 26 and the dequantizer 27. In FIG. 2, the recorded signals RI convey the error signals E and the frame number signals, as shown in FIG. 1. The error signals E are assumed to be produced by predictively coding a sequence of image signals derived from a moving image, like in FIG. 1.

The recorded signals RI are successively read out of the CD-ROM 10 and sent to the code inverter 26 to be subjected to code inversion into a sequence of code inverted signals each of which has a variable length in a known manner and which is divisible into a succession of frames having a frame period. Thus, the recorded signals RI are preliminarily processed by the code inverter 26 into the code inverted signals before they are sent to the intermediate circuit 31. In this connection, the code inverter 26 may be called a preliminary processing circuit and the code inverted signals may be called a sequence of preliminary processed signals.

The code inverted signals are delivered to the intermediate circuit 31 which is supplied with an external command signal COM representative of a command which is issued from an operator or user when the operator wishes to watch a part of the recorded signals RI as a still image. The command in question may therefore be referred to as a still image reproduction command.

Figure 3:
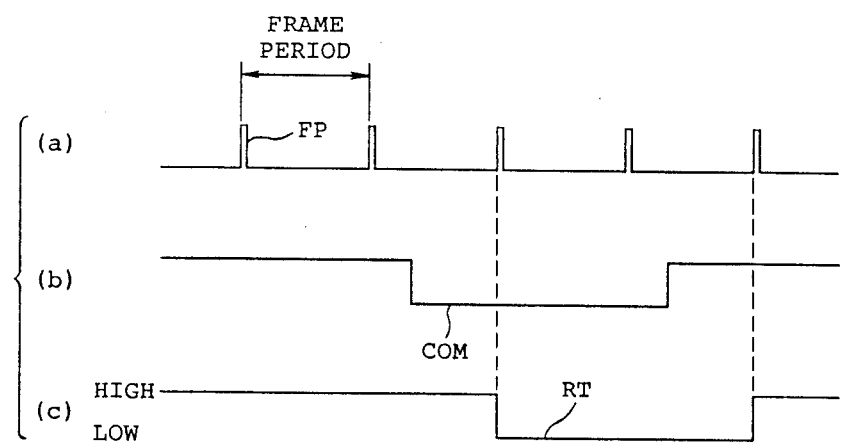
FIG. 3 is a time chart for use in describing an operation of the reproduction system illustrated in FIG. 2.

Referring to FIGS. 2 and 3, the intermediate circuit 31 comprises a frame pulse generator 33 which produces a sequence of frame pulses FP having a pulse period equal to the frame period of the code inverted signals, as shown along a top line (a) of FIG. 3. The frame pulse sequence FP is sent to a resampling circuit 34 operable in response to the external command signal COM which is specified by a recessed portion or a low level portion along a middle line (b) of FIG. 3. It should be understood that the still image reproduction command is issued by the operator or user irrespective of the frame pulses FP and is therefore not always synchronized with the frame pulses FP. For this reason, the illustrated external command signal COM is not synchronized with the frame pulses FP. From this fact, it is readily understood that the resampling circuit 34 is supplied with a high level signal in the absence of the external command signal COM, as illustrated in FIG. 3.

The resampling circuit 34 resamples or retimes the external command signal COM by the frame pulses FP to produce, as a circuit output signal, a resampled signal RT of a low level which appears in synchronism with the frame pulses FP, as shown along a bottom line (c) of FIG. 3. The circuit output signal of the resampling circuit 34 takes a high level in the absence of the resampled signal RT. Inasmuch as the external command signal COM is resampled by the frame pulses FP, the resampled signal RT is produced for a time interval equal to an integral multiple of the frames. Such a resampling circuit 34 may be implemented by a delay flip-flop and therefore will not be described further.

The circuit output, signal is sent to a gate circuit 35 which receives the code inverted signals from the code inverter 26. The gate circuit 35 is closed during the resampled signal RT and is opened during all other times. It is to be noted here that the code inverted signals, namely preliminary processed signals, are interrupted during the resampled signal RT. As a result, the code inverted signals are modified by the gate circuit 35 into a sequence of modified signals MD which is specified by interruption of the code inverted signals during the resampled signal RT and, otherwise, by the code inverted signals. As a result, the modified signals MD will be defined by a predetermined level or zero level when the resampled signal RT is present and will be substantially equal to the code inverted signals (appearing at the output of code inverter 26) in the absence of the resampled signal RT. Thus, the intermediate circuit 31 serves to modify the code inverted signals into the modified signals MD and may therefore be referred to as a modifying circuit.

The modified signals MD are sent to the dequantizer 27 as an intermediate circuit output signal through a connection between the gate circuit 35 and the dequantizer 27 and are successively dequantized into a sequence of dequantized signals in a manner similar to that illustrated in FIG. 1. The dequantized signals are reproductions of the error signals E(i) mentioned in conjunction with FIG. 1 and may therefore be depicted at E(i)'. The dequantized signals E(i)'0 are added to a sequence of decoded prediction signals V(i)' by the adder circuit 18 into a sequence of reproduced image signals RP in the manner illustrated in FIG. 1.

Let the external command signal COM be given from an external device to the resampling circuit 34 in response to the still image reproduction command issued from an operator or user. The external command signal COM is resampled by the frame pulses FP into the resampled signal RT. The resampled signal RT lasts for an interval of time defined by the external command signal COM and the frame pulses FP.

The resampled signal RT is sent to the gate circuit 35 to close or interrupt the gate circuit 35. In this event, the resampled signal RT is also sent to the CD-ROM 10 through an electrical connection (not shown).

It is assumed that the same recorded signals RI are repeatedly read out of an identical portion of the CD-ROM 10 in response to the resampled signal RT during a still image reproduction. This shows that an identical portion of the CD-ROM 10 is repeatedly accessed during the still image reproduction. Such a repeated access operation of an identical portion serves to keep continuity of a moving image on restarting to reproduce a moving image from the CD-ROM 10. This is because a reproduction of the moving image can be restarted from a next following portion which follows the repeatedly accessed portion after the still image reproduction. However, such a repeated access of an identical portion is not essential if the discontinuity of a moving image is acceptable before and after the still image reproduction.

On the other hand, the gate circuit 35 is closed in response to the resampled signal RT. Such closure of the gate circuit 35 lasts for the interval which is defined by the external command signal COM and the frame pulses FP and which is equal to an integral multiple of the frame period, as mentioned before. During the closure of the gate circuit 35, the code inverted signals are interrupted by the gate circuit 35. As a result, the modified signals MD carry no code inverted signal and are dequantized by the dequantizer 27. From this fact, it is readily understood that no error signal E(i)' is supplied from the dequantizer 27 to the adder circuit 18 during the closure of the gate circuit 35.

Under the circumstances, the prediction decoded signals V(i)' are given from the prediction circuit 29 to the adder circuit 18 without any error signal E(i)' while the gate circuit 35 is closed. Accordingly, only the prediction decoded signals V(i)' are produced as the reproduced image signals RP on one hand and are sent to the prediction circuit 29 on the other hand. The prediction circuit 29 cyclically supplies the adder circuit 18 with the prediction decoded signals V(i)' which are substantially invariable and which are produced as the reproduced image signals RP again. Similar operation is cyclically carried out during the closure of the gate circuit 35 by the adder circuit 18 and the prediction circuit 29. Thus, the still image reproduction is made by repeatedly producing the same reproduced image signals RP for the interval determined by the resampled signal RT.

With this structure, the resampled signal RT is sent to the gate circuit 35 within a single frame period after production of the external command signal COM, as readily seen from FIG. 3. In addition, the resampled signal RT disappears extinct within a single frame period after extinction of the external command signal COM. Therefore, it is possible to quickly switch from the moving image reproduction to the still image reproduction or to quickly restart the moving image reproduction.

As mentioned before, the error signals E(i)' are forcibly interrupted by the gate circuit 35 on the still image reproduction to be rendered substantially zero. The reproduced image signals RP are repeatedly produced by a cooperation of the adder circuit 27 and the prediction circuit 29 during interruption of the error signals E(i)' so as to enable the still image reproduction. This means that the illustrated decoder 14 can reproduce a still image without any buffer memory which otherwise may be used to store the reproduced image signals RP.

In FIG. 2, each of the recorded signals RI may be recorded on the CD-ROM 10 in the form of a variable length code produced by code conversion of the error signals E(i), like in FIG. 1. In order to enable further redundancy reduction or compression, such code conversion may be made by weighting each bit of the error signals E(i) in consideration of frequencies of occurrence of each bit. This enables a long-term reproduction of the image signals in spite of use of a CD-ROM which is mainly used for recording an audio signal. Such a long-term reproduction of the image signals can be also established by dividing the error signals into blocks and by carrying out orthogonal transform and vector quantization at every block.

At any rate, the still image reproduction can be carried out by a combination of the resampling circuit 34 and the gate circuit 35 even when a phase deviation is present between the code inverted signals and the external command signal COM. In addition, the resampled signal RT lasts for at least one frame period. This results in a reproduction of a stable and even still image.

Figure 4:
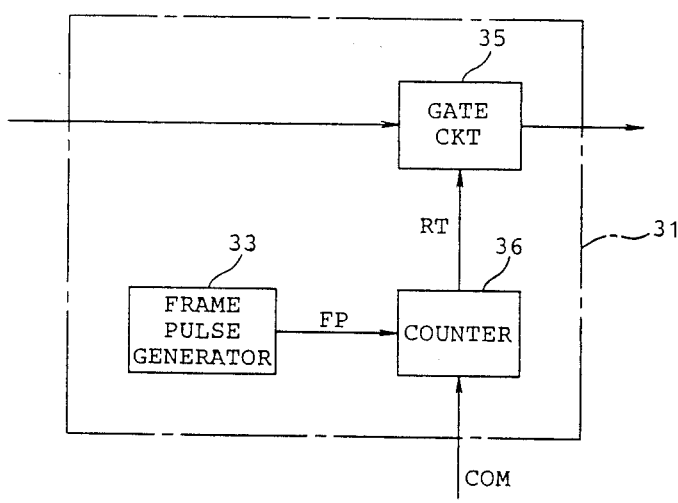
FIG. 4 is a block diagram of a part of a reproduction system according to another embodiment of this invention.
Figure 5:
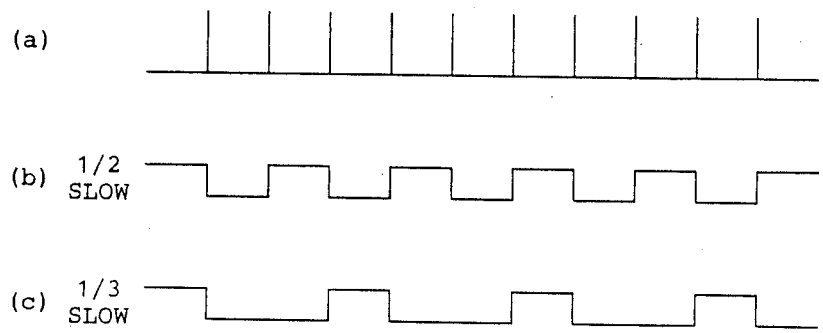
FIG. 5 consisting of (a)–(c), is a time chart for use in describing an operation of the reproduction system illustrated in FIG. 3.

Referring to FIGS. 4 and 5, a reproduction system according to another embodiment of the invention is shown. This system may be used to reproduce, from moving images carried by the recorded signals RI, a slow motion image which is slowly varied with time in comparison with the moving images. For this purpose, the illustrated intermediate circuit 31 comprises a programmable counter 36 supplied with an external command signal COM which is representative of a slow motion reproduction. Herein, the slow motion image is varied at a slow motion rate related to a number of frame pulses FP shown in FIG. 4(a). The external command signal COM may indicate the slow motion rate.

When the external command signal COM indicates the slow motion rate of ½, the counter 36 frequency divides the frame pulses FP into a resampled signal RT having a repetition frequency equal to a half of the frame pulses FP, as shown in FIG. 4(b). As a result, the gate circuit 35 is closed at every other frame pulse FP to enable a reproduction of the images at the slow motion rate of ½.

Likewise, the gate circuit 35 is opened at every third frame pulse, as shown in FIG. 4(c), when the slow motion rate of ⅓ is indicated by the external command signal COM.

While this invention has thus far been described in conjunction with a preferred embodiment thereof, it will readily be possible for those skilled in the art to put this invention into practice in various other manners. For example, any other magnetic tape, such as a video tape, may be substituted for the CD-ROM. The predictive coding may be interframe coding, intraframe coding, or the like. The gate circuit 35 may be located either before the code inverter 26 or after the dequantizer 27. When the gate circuit 35 is located before the code inverter 26, the recorded signals RI are directly supplied to the gate circuit 35 and may be referred to as the preliminary processed signals for convenience of description. When the gate circuit 35 is located after the dequantizer 27, the recorded signals RI are preliminarily processed by the code inverter 26 and the dequantizer 27.

What is claimed is:

1. A reproduction system for use with a recording medium having stored therein a sequence of codes obtained by coding a sequence of predictive error signals which are derived from a sequence of moving images divisible into frames, said sequence of predictive error signals being produced by carrying out interframe predictive coding, said reproduction system reproducing said sequence of predictive error signals into a sequence of reproduced image signals and comprising:

error signal deriving means for deriving said sequence of predictive error signals in response to receipt of said sequence of said codes from said recording medium;

signal interrupting means receiving said sequence of predictive error signals and intermittently receiving a still image command signal, said signal interrupting means applying said sequence of predictive error signals to reproducing means in response to the absence of said still image command signal and applying a constant signal to said reproducing means in response to the receipt of said still image command signal; and said reproducing means coupled to said signal interrupting means for reproducing a still image when it receives said constant signal and for reproducing said moving images when it receives said sequence of predictive error signals.

2. A reproduction system as claimed in claim 1, wherein said signal interrupting means comprises:

pulse generating means for producing a sequence of timing pulses synchronized with said frames;

retiming means for synchronizing said still image command signal with said timing pulses to produce a retimed command signal synchronized with said frames; and stopping means responsive to said sequence of the predictive error signals and said retimed signal for preventing said sequence of predictive error signals from being applied to said reproducing means during presence of said retimed signal and for allowing said sequence of predictive error signals to be applied to said reproducing means at all other times.

3. A reproduction system for use with a recording medium having stored therein a sequence of codes obtained by coding a sequence of predictive error signals which are derived from the sequence of moving images divisible into frames, said sequence of predictive error signals being produced by carrying out interframe predictive coding, said reproduction system reproducing said sequence of predictive error signals into a sequence of reproduced image signals and comprising:

error signal deriving means for deriving said sequence of predictive error signals in response to receipt of said sequence of codes from said recording medium;

signal modifying means receiving said sequence of predictive error signals and intermittently receiving a slow motion command signal; said signal modifying means applying said sequence of predictive error signals to reproducing means at a first rate in response to the absence of said slow motion command signal and applying at least some of said sequence of predictive error signals to said reproducing means at a second rate, slower than said first rate, in response to the receipt of said slow motion command signal; and said reproducing means being coupled to said signal modifying means for reproducing a slow motion image when it receives said at least some of said sequence of predictive error signals at said second rate and for reproducing said moving images at normal speed when it receives said sequence of predictive error signals at said first rate.

4. A reproduction system as claimed in claim 3, wherein said signal modifying means comprises:

pulse generating means for producing a sequence of timing pulses synchronized with said frames;

resampling means responsive to said timing pulses and to said slow motion command signal for synchronizing said slow motion command signal with said timing pulse to produce a retimed command signal synchronized with said frames; and interrupting means responsive to said sequence of predictive error signals and said retimed command signal for passing only selected ones of said sequence of predictive error signals to said reproducing means thereby causing said reproducing means to reproduce said moving images in slow motion.

* * * * *